(12) United States Patent
Doko et al.

(10) Patent No.: US 9,598,990 B2
(45) Date of Patent: Mar. 21, 2017

(54) EJECTOR

(71) Applicants: Yukihiro Doko, Chita-gun (JP); Jun Ikeda, Nagoya (JP)

(72) Inventors: Yukihiro Doko, Chita-gun (JP); Jun Ikeda, Nagoya (JP)

(73) Assignees: AISAN KOGYO KABUSHIKI KAISHA, Obu-shi (JP); TOYOTA JIDOSHA KABUSHIKI KAISHA, Toyota (JP)

(*) Notice: Subject to any disclaimer, the term of this patent is extended or adjusted under 35 U.S.C. 154(b) by 279 days.

(21) Appl. No.: 13/770,522

(22) Filed: Feb. 19, 2013

(65) Prior Publication Data

US 2013/0213369 A1    Aug. 22, 2013

(30) Foreign Application Priority Data

Feb. 17, 2012    (JP) ................................. 2012-032867

(51) Int. Cl.
*F01M 13/02* (2006.01)
*F02M 25/06* (2016.01)
*F04D 9/06* (2006.01)

(52) U.S. Cl.
CPC .......... *F01M 13/023* (2013.01); *F02M 25/06* (2013.01); *F01M 2013/026* (2013.01); *F04D 9/06* (2013.01); *Y02T 10/121* (2013.01)

(58) Field of Classification Search
CPC ...... F02M 25/06; F02M 23/14; B01D 35/157; F01M 13/02; F04F 5/46; F04F 5/48; F04F 5/50; F04F 5/52; F04D 9/06; F04D 9/065

(Continued)

(56) References Cited

U.S. PATENT DOCUMENTS 3,441,045 A * 4/1969 Malone ................ B01F 5/0495
                                                    417/187
7,100,587 B2   9/2006 Ahlborn et al.
(Continued)

FOREIGN PATENT DOCUMENTS

DE    102004002021 A1    7/2004
EP       2 182 185 A1    5/2010
(Continued)

OTHER PUBLICATIONS

English Translation of Japanese Patent 48005292, Jul. 2015.*
(Continued)

*Primary Examiner* — Devon Kramer
*Assistant Examiner* — Connor Tremarche
(74) *Attorney, Agent, or Firm* — Oliff PLC

(57) ABSTRACT

An ejector includes: a decompression chamber in an outer pipe on an air entrance side; a throat in the outer pipe on an air exit side; a nozzle in the outer pipe on the air entrance side, the nozzle having a leading end portion placed in a decompression chamber to inject air; and a suction port in the decompression chamber to suck blow-by gas into the decompression chamber. The air injected from the nozzle generates negative pressure in the decompression chamber to suck in blow-by gas through the suction port, and the sucked gas is discharged together with air through a throat. The valve in the nozzle includes a valve seat, a valve element, and a spring to press the valve element in a direction to separate from the valve seat. The valve element is formed with a bottom-closed cavity opening toward an upstream side of an air flow.

12 Claims, 4 Drawing Sheets

(58) Field of Classification Search
USPC .............. 417/162, 165, 182, 187, 190, 191; 123/568.11, 568.15; 55/417
See application file for complete search history.

(56) References Cited

U.S. PATENT DOCUMENTS

| | | | |
|---|---|---|---|
| 2003/0172632 A1 | 9/2003 | Matsubara et al. | |
| 2005/0002797 A1* | 1/2005 | Morishima ............. | F04F 5/461 417/182 |
| 2009/0308364 A1* | 12/2009 | Konohara ............ | F01M 13/022 123/572 |
| 2009/0317691 A1* | 12/2009 | Yamada et al. ................. | 429/34 |

FOREIGN PATENT DOCUMENTS

| | | | |
|---|---|---|---|
| JP | 48005292 | * | 2/1973 |
| JP | 48005292 A1 | * | 2/1973 |
| JP | S48-5292 U | | 2/1973 |
| JP | A-54-062431 | | 5/1979 |
| JP | S63-158516 U | | 10/1988 |
| JP | H08-240273 A | | 9/1996 |
| JP | A-2003-254031 | | 9/2003 |
| JP | A-2009-299645 | | 12/2009 |
| JP | 2010001867 A | | 1/2010 |
| JP | 2010-112178 A | | 5/2010 |

OTHER PUBLICATIONS

Oct. 10, 2014 Office Action issued in Chinese Application No. 201310051348.9.
Jun. 2, 2015 Notification of Reasons for Refusal issued in Japanese Application No. 2012-032867.
May 18, 2015 Office Action issued in Chinese Patent Application No. 201310051348.9.
Mar. 7, 2016 Office Action issued in German Application No. 10 2013 202 348.0.

* cited by examiner

EJECTOR

CROSS-REFERENCE TO RELATED APPLICATIONS

This application is based upon and claims the benefit of priority from the prior Japanese Patent Application No. 2012-032867 filed on Feb. 17, 2012, the entire contents of which are incorporated herein by reference.

BACKGROUND OF THE INVENTION

Field of the Invention

The present invention relates to an ejector arranged to flow working fluid to generate negative pressure and cause target fluid to flow by action of the negative pressure.

Related Art

As the above type of technique, heretofore, there is known a jet pump (an ejector) used in a blow-by gas returning device disclosed for example in Patent Document 1 listed below. This blow-by gas returning device is mounted in an engine including a supercharger in an intake passage and configured to return or recirculate blow-by gas generated in the engine to the intake passage through a blow-by gas returning passage. This returning device includes a bypass passage connecting an upstream portion and a downstream portion of the intake passage with respect to the supercharger, and an ejector for generating negative pressure in the bypass passage. An exit of the blow-by gas returning passage is connected to the bypass passage via the ejector. Accordingly, during operation of the supercharger, a pressure difference of intake air occurs between the upstream side and the downstream side of the supercharger in the intake passage and also between both ends of the bypass passage. By this pressure difference, air is caused to flow as working fluid in the bypass passage, thereby generating negative pressure in the ejector. By action of this negative pressure, blow-by gas is caused to flow as target fluid into the ejector through the blow-by gas returning passage, and then flow to the intake passage through the bypass passage.

In the above returning device, as the supercharging pressure by the supercharger rises, the air flow rate in the bypass passage, that is, the amount of air allowed to flow in the ejector increases, so that the negative pressure generated in the ejector becomes higher. Accordingly, the flow rate of blow-by gas caused to flow to the intake passage via the blow-by gas returning passage, ejector, and bypass passage increases with a rise in supercharging pressure.

RELATED ART DOCUMENTS

Patent Documents

Patent Document 1: JP-A-2009-299645

SUMMARY OF INVENTION

Problems to be Solved by the Invention

However, in the ejector disclosed in Patent Document 1, the amount of air flowing in the ejector increases as the supercharging pressure rises, and hence the negative pressure generated in the ejector increases. Accordingly, the flow rate of blow-by gas to be returned to the engine also increases. In some cases, the blow-by gas may be excessively returned to the engine. In this case, engine oil is carried away together with the blow-by gas from a crank case of the engine. This causes a concern that the engine oil is overconsumed by just that much. Furthermore, an air-fuel ratio of the engine changes as the returning amount of blow-by gas increases, which may lead to deterioration in exhaust emission of the engine. It is therefore demanded to reduce the negative pressure generated in the ejector to a certain extent even when the pressure of air (the supercharging pressure) applied to the ejector increases, thereby restraining an increase in blow-by gas returning amount. Since the use of the ejector is not limited to the returning device of Patent Document 1, the same demand as above may also be requested in other cases.

The present invention has been made in view of the circumstances and has a purpose to provide an ejector capable of preventing an increase in flow rate of a working fluid even when the pressure of the working fluid rises, thereby suppressing the generation of negative pressure to prevent a flow rate of target fluid from increasing more than necessary.

Means of Solving the Problems

To achieve the above purpose, one aspect of the invention provides an ejector including: an outer pipe; a decompression chamber provided in the outer pipe on an entrance side for working fluid; a throat provided in the outer pipe on an exit side for the working fluid; a nozzle provided in the outer pipe on the entrance side for the working fluid, the nozzle including a leading end portion placed in the decompression chamber to inject the working fluid; a suction port provided in the outer pipe to open into the decompression chamber to suck target fluid into the decompression chamber, the ejector being configured such that the working fluid injected from the nozzle generates negative pressure in the decompression chamber to suck in the target fluid through the suction port, and the sucked target fluid is discharged together with the working fluid from the outer pipe, wherein the nozzle is provided with a valve to regulate a flow rate of the working fluid allowed to flow through the nozzle, the valve includes a valve seat, a valve element provided to be movable into and out of contact with the valve seat, and a spring to urge the valve element in a direction to separate from the valve seat, and the valve element is formed in a bottom-closed cavity, and the cavity opening toward an upstream side of the working fluid.

Advantageous Effects of Invention

According to the invention, it is possible to prevent an increase in flow rate of working fluid even when the pressure of the working fluid acting on a nozzle rises, thereby suppressing the generation of negative pressure by an ejector to prevent a flow rate of target fluid from increasing more than necessary. Furthermore, it is possible to prevent the worsening of movement of a valve element due to sludge and thus reduce variations in flow characteristics of working fluid caused by the ejector.

DESCRIPTION OF EMBODIMENTS

A detailed description of a preferred embodiment of an ejector embodying the present invention applied to a blow-by gas returning device of an engine will now be given referring to the accompanying drawings.

Figure 1:
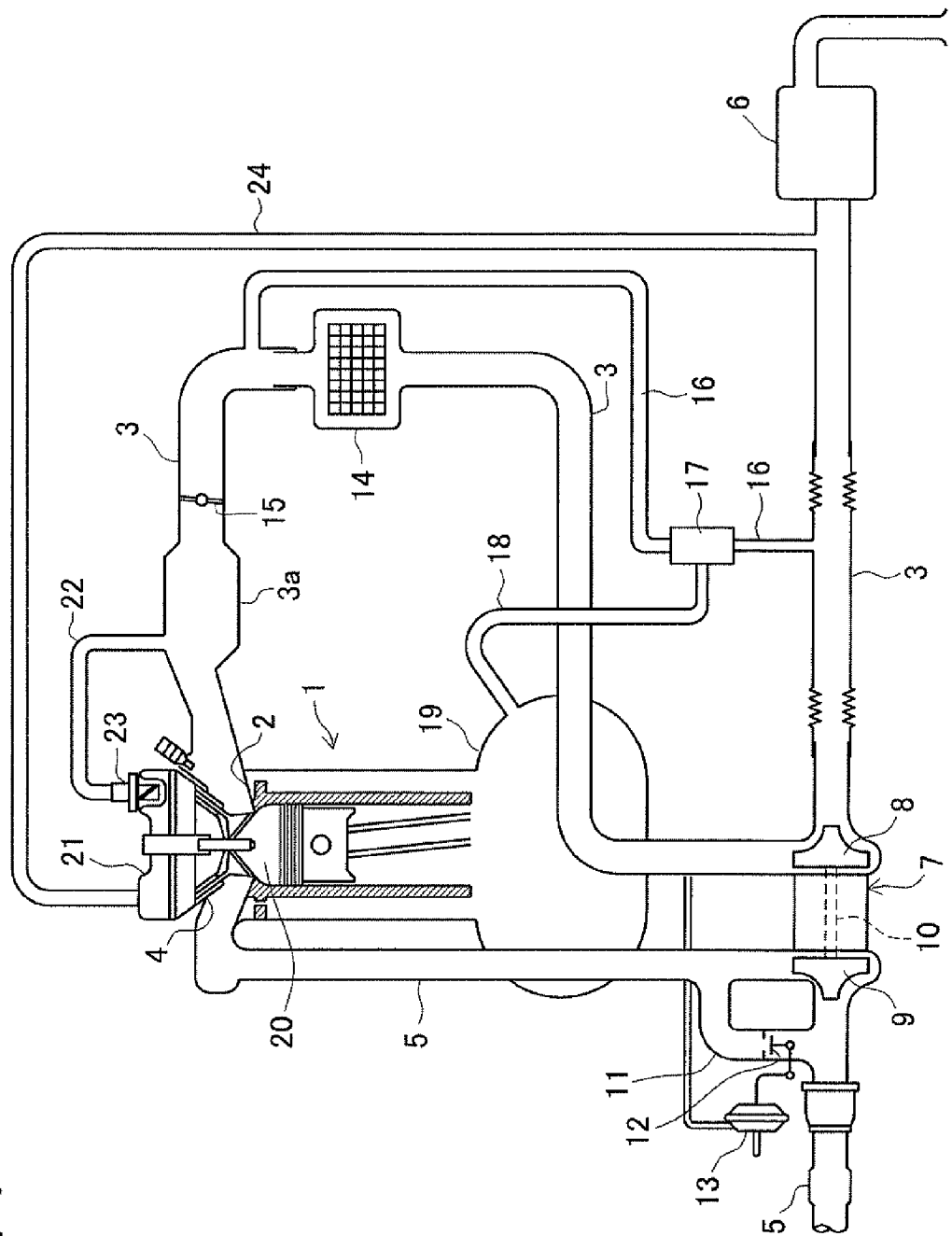
FIG. 1 is a schematic configuration view showing an engine system including a blow-by gas returning device in an embodiment.

FIG. 1 is a schematic configuration view showing an engine system including a blow-by gas returning device in the present embodiment. This engine system includes a reciprocal-type engine 1. An intake port 2 of the engine 1 is connected to an intake passage 3, and an exhaust port 4 of the engine 1 is connected to an exhaust passage 5. At an inlet of the intake passage 3, an air cleaner 6 is provided. Between the intake passage 3 downstream of the air cleaner 6 and the exhaust passage 5, a supercharger 7 is provided to increase the pressure of intake air in the intake passage 3.

The supercharger 7 includes a compressor 8 placed in the intake passage 3, a turbine 9 placed in the exhaust passage 5, and a rotary shaft 10 connecting the compressor 8 and the turbine 9 so that they are integrally rotated. The supercharger 7 is configured such that the turbine 9 is rotated by exhaust gas flowing in the exhaust passage 5, thereby integrally rotated the compressor 8 via the rotary shaft 10 to increase the pressure of intake air in the intake passage 3, that is, to perform supercharging.

The exhaust passage 5 is provided with an exhaust bypass passage 11 adjacent to the supercharger 7 to bypass the turbine 9. In this exhaust bypass passage 11, a waste gate valve 12 is placed. An opening of the valve 12 is adjusted by a diaphragm type actuator 13. When the exhaust gas flowing in the exhaust bypass passage 11 is regulated by the valve 12, the flow rate of exhaust gas to be supplied to the turbine 9 is regulated, thereby adjusting the rotation speed of the turbine 9 and the compressor 8 to control the supercharging pressure provided by the supercharger 7.

In the intake passage 3, an intercooler 14 is placed between the compressor 8 of the supercharger 7 and the engine 1. This intercooler 14 serves to cool the intake air having the pressure increased by the compressor 8, down to an appropriate temperature. The intake passage 3 is provided with a surge tank 3a between the intercooler 14 and the engine 1. Upstream of the surge tank 3a in the intake passage 3, a throttle valve 15 is placed.

An upstream portion and a downstream portion of the intake passage 3 with respect to the supercharger 7 are connected by an intake bypass passage 16. Specifically, the intake bypass passage 16 is provided between the intake passage 3 downstream of the compressor 8 and the intercooler 14, where the supercharging pressure is high, and the intake passage 3 upstream of the compressor 8 to bypass the compressor 8. In this intake bypass passage 16, an ejector 17 is provided to generate negative pressure using the air flowing in the bypass passage 16.

Figure 2:
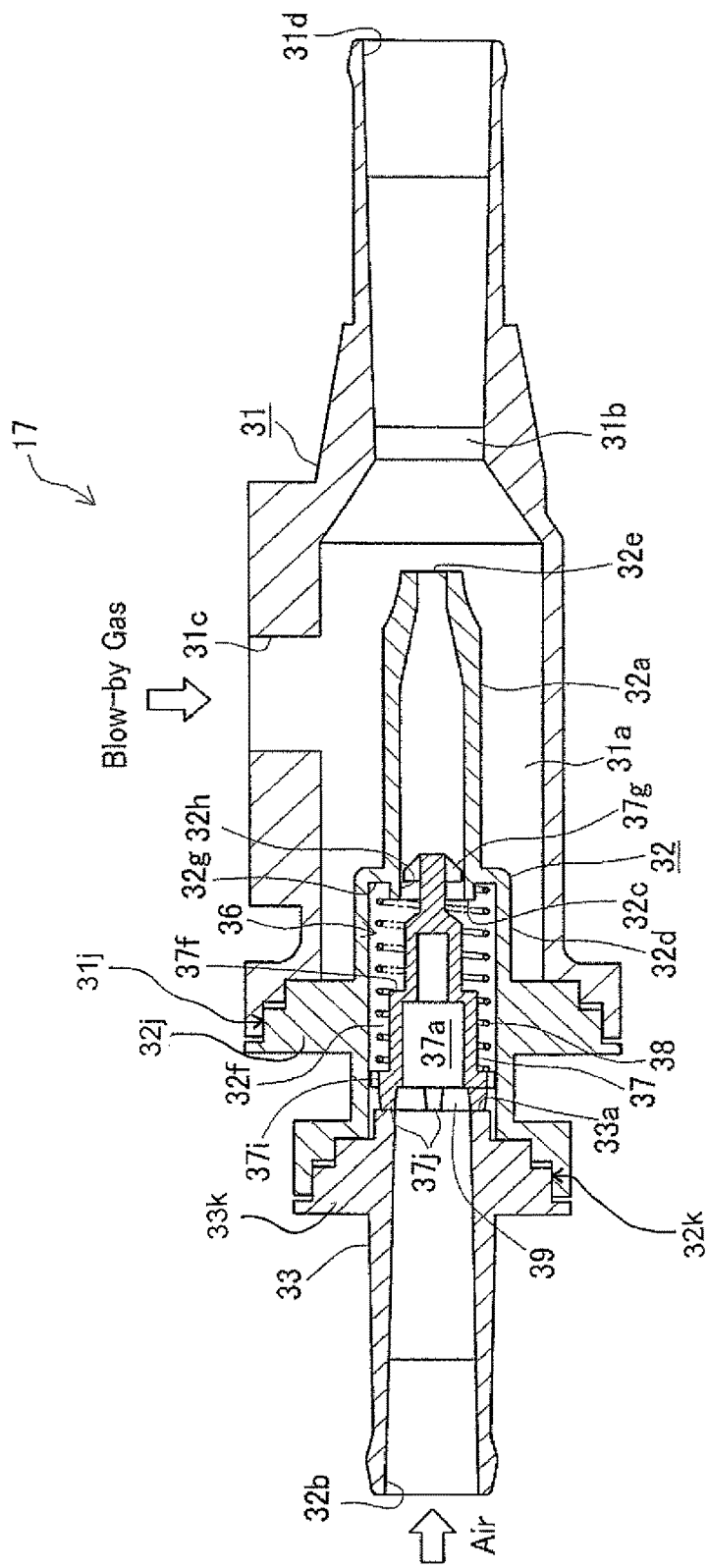
FIG. 2 is a cross sectional view of an ejector in the embodiment.

FIG. 2 is a cross sectional view of the ejector 17. This ejector 17 includes an outer pipe 31. In the outer pipe 31, on an entrance side for air as working fluid, a decompression chamber 31a is formed. In the outer pipe 31, on an exit side for air, a throat 31b having a constricted shape is formed. Furthermore, a nozzle 32 having a flange 32j is placed on the air entrance side in an opening 31j in the outer pipe 31. A leading end portion 32a of the nozzle 32 is placed in the decompression chamber 31a and configured to inject air. In the outer pipe 31, the decompression chamber 31a is formed with a suction port 31c to suck blow-by gas as target fluid into the decompression chamber 31a. An entrance 32b of the nozzle 32 is connected to an upstream side of the intake bypass passage 16. An exit 31d of the outer pipe 31 is connected to a downstream side of the intake bypass passage 16. The suction port 31c of the outer pipe 31 is connected to a first blow-by gas returning passage 18 mentioned later. When air is injected from the leading end portion 32a of the nozzle 32, negative pressure is generated in the decompression chamber 31a. This negative pressure acts on the suction port 31c, sucking in blow-by gas through the suction port 31c from the first blow-by gas returning passage 18. The sucked blow-by gas is discharged together with the air through the throat 31b and out of the outer pipe 31 through the exit 31d.

Herein, as shown in FIG. 2, the nozzle 32 is provided with a valve 36 to regulate the flow rate of air allowed to pass through the nozzle 32. This valve 36 includes a valve seat 32c provided in the nozzle 32, a valve element 37 movable into and out of contact with the valve seat 32c, and a spring 38 pressing the valve element 37 to separate from the valve seat 32c.

Figure 3:
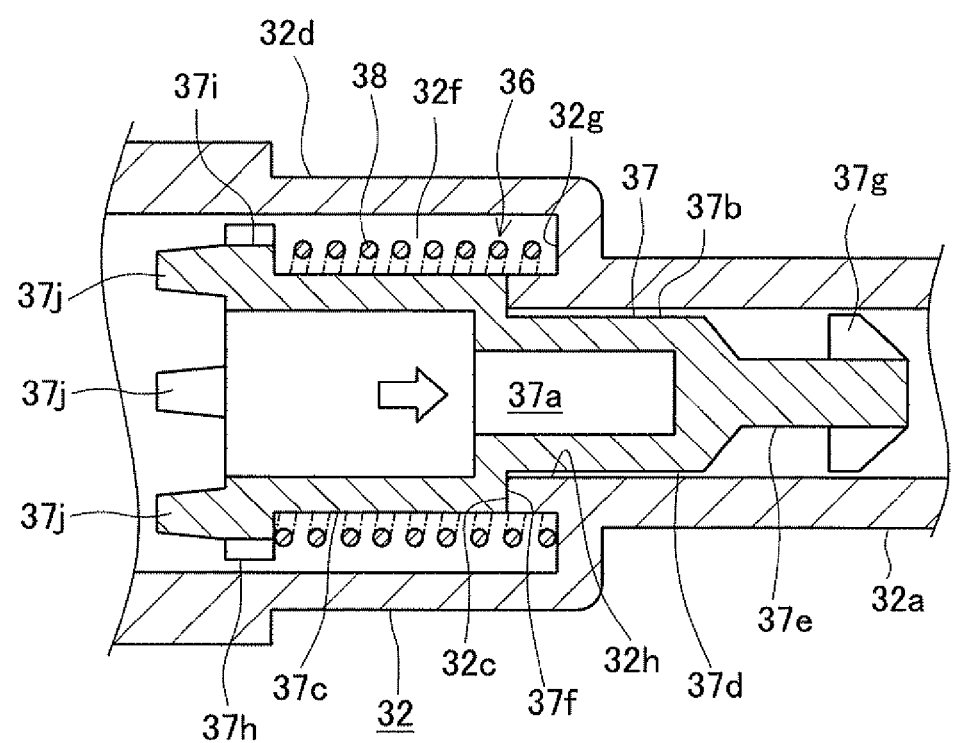
FIG. 3 is an enlarged cross sectional view showing a valve of the ejector in the embodiment.

FIG. 3 is an enlarged cross sectional view showing the valve 36 in the ejector 17. As shown in FIG. 2, the nozzle 32 is of a cylindrical shape having a multi-stepped outer peripheral surface. The nozzle 32 includes a large-diameter base portion 32d and a small-diameter leading end portion 32a, and an injection port 32e at the tip of the leading end portion 32a. The hollow space of the base portion 32d forms a valve chamber 32f in which the valve element 37 is accommodated. Inside the nozzle 32, the valve seat 32c is formed on a shoulder portion 32g located at a boundary between the leading end portion 32a and the base portion 32d. A valve hole 32h is formed at the center of the valve seat 32c. This valve hole 32h is continuous to the hollow space of the leading end portion 32a of the nozzle 32. In an opening 32k in the base portion 32d of the nozzle 32, a separately-formed pipe joint 33 having a flange 33k is provided, so that an opening of the pipe joint 33 defines the entrance 32b of the nozzle 32.

As shown in FIGS. 2 and 3, the valve element 37 of the valve 36 has a hollow columnar shape having a multi-stepped outer peripheral surface and a closed bottom. A cavity 37a of the valve element 37 opens toward the upstream side of an air flow. The valve element 37 includes a protruding portion 37b loosely inserted in the valve hole 32h. Specifically, the valve element 37 includes a large-diameter portion 37c, a middle-diameter portion 37d, and a small-diameter portion 37e. The large-diameter portion 37c and the middle-diameter portion 37d are designed to internally form the cavity 37a. The middle-diameter portion 37d and the small-diameter portion 37e constitute the protruding portion 37b. The boundary between the large-diameter portion 37c and the middle-diameter portion 37d provides a flat shoulder 37f. The outer diameter of the middle-diameter portion 37d is set to be slightly smaller than the inner diameter of the leading end portion 32a of the nozzle 32 to allow air to flow between the middle-diameter portion 37d and the leading end portion 32a. At a leading end of the small-diameter portion 37e, a plurality of ribs 37g are formed to guide movement of the small-diameter portion 37e in the leading end portion 32a of the nozzle 32. At a base end of the large-diameter portion 37c, a flange 37h is formed. The outer diameter of the flange 37h is set to be slightly smaller than the inner diameter of the base portion 32d of the nozzle 32, so that air is allowed to flow through between the flange 37h and the base portion 32d. On the outer periphery of the flange 37h, a plurality of grooves 37i are formed, so that air is also allowed to flow through the grooves 37*i*. An end face of the flange 37*h* is formed with a plurality of protruding leg portions 37*j*.

In the above configuration, while no air flows in the nozzle 32, the valve element 37 is pressed or urged by the spring 38 in a fully opening direction (leftward in FIG. 2) to hold the valve 36 in contact with a part of the nozzle 32 as shown in FIG. 2. To be concrete, in a fully opened state of the valve 36, as shown in FIG. 2, the leg portions 37*j* formed on the end face of the flange 37*h* of the valve element 37 are pressed by the spring 38 to abut on the end face 33*a* of the pipe joint 33 provided in the base portion 32*d* of the nozzle 32. In this state, a flow passage 39 is provided between the end face 33*a* of the pipe joint 33 and the flange 37*h* of the valve element 37 through the leg portions 37*j*. In other words, the valve 36 is configured such that while the valve element 37 is in contact with a part of the nozzle 32, the flow passage 39 is formed between the valve element 37 and the nozzle 32. Accordingly, when air enters the nozzle 32 in this state through the entrance 32*b*, the air is allowed to flow in the nozzle 32 through the flow passage 39.

On the other hand, as shown in FIG. 3, the valve 36 is also configured such that the air pressure acting on the valve element 37 increases to a certain degree when air is introduced in the nozzle 32. At that time, the valve element 37 is pressed by the air pressure against the pressing force of the spring 38, and the shoulder 37*f* of the valve element 37 comes into contact with the valve seat 32*c*, and the valve element 37 blocks off the flow passage in the nozzle 32. That is, the valve 36 comes to a valve closed state.

In FIG. 2, the suction port 31*c* formed in the decompression chamber 31*a* of the ejector 17 is connected to an exit of the first blow-by gas returning passage 18 as shown in FIG. 2. An entrance of this first blow-by gas returning passage 18 is connected to the crank case 19 of the engine 1. The first blow-by gas returning passage 18 serves to allow the blow-by gas leaking out of a combustion chamber 20 of the engine 1 into the crank case 19 to flow back to the combustion chamber 20 through the intake passage 3. During operation of the supercharger 7, accordingly, the supercharging pressure causes the air to flow in the ejector 17, generating negative pressure in the decompression chamber 31*a* of the ejector 17. This negative pressure acts on the crank case 19 through the first blow-by gas returning passage 18. By this action of negative pressure, the blow-by gas is introduced from the crank case 19 to the returning passage 18. The blow-by gas then flows into the intake passage 3 through the ejector 17 and the intake bypass passage 16. The blow-by gas flowing in the intake passage 3 is returned to the combustion chamber 20 of the engine 1 via the compressor 8, the intake passage 3, and others.

In the present embodiment, a head cover 21 of the engine 1 is connected to a second blow-by gas returning passage 22 to allow the blow-by gas leaking out of the combustion chamber 20 to flow back to the combustion chamber 20 through the intake passage 3. An exit of the second blow-by gas returning passage 22 is connected to the surge tank 3*a* of the intake passage 3. During operation of the engine 1 but non-operation of the supercharger 7, the pressure in the surge tank 3*a* is negative. This negative pressure acts on the second blow-by gas returning passage 22. This makes the blow-by gas flow from the head cover 21 to the second blow-by gas returning passage 22. In the head cover 21, a PCV valve 23 is provided in the entrance of the second blow-by gas returning passage 22. This PCV valve 23 serves to regulate the flow rate of blow-by gas to be introduced from the head cover 21 to the second blow-by gas returning passage 22.

In this embodiment, a fresh air introducing passage 24 to introduce fresh air in the head cover 21 and the crank case 19 is provided between the engine 1 and the intake passage 3. An entrance of this fresh air introducing passage 24 is connected to the intake passage 3 near the air cleaner 6 and an exit of the same passage 24 is connected to the head cover 21. The inside of the head cover 21 and the inside of the crank case 19 are continuous to each other via a communication passage (not shown) provided in the engine 1.

According to the blow-by gas returning device in the present embodiment explained above, during operation of the engine 1 but non-operation of the supercharger 7, the negative pressure generated in the intake passage 3 downstream of the valve throttle valve 15 acts on the second blow-by gas returning passage 22. By this action of negative pressure, the blow-by gas staying in the head cover 21 is caused to flow to the surge tank 3*a* through the second blow-by gas returning passage 22. Accordingly, during non-operation of the supercharger 7, it is possible to return the blow-by gas in the head cover 21 back to the combustion chamber 20 via the second blow-by gas returning passage 22 and the intake passage 3. At that time, the flow rate of blow-by gas allowed to flow from the head cover 21 to the second blow-by gas returning passage 22 is regulated to an appropriate value by the PCV valve 23.

On the other hand, during operation of the engine 1 and operation of the supercharger 7, the pressure in the intake passage 3 downstream of the supercharger 7 is positive pressure (supercharging pressure). Thus, the negative pressure does not act on the exit of the second blow-by gas returning passage 22. Accordingly, no blow-by gas is discharged from the head cover 21 to the intake passage 3 through the second blow-by gas returning passage 22. At that time, a pressure difference in intake air occurs between the upstream side and the downstream side of the supercharger 7 in the intake passage 3. Simultaneously, a pressure difference in intake air also occurs between both ends of the intake bypass passage 16. This pressure difference (supercharging pressure) causes air to flow in the intake bypass passage 16, thereby generating negative pressure in the ejector 17. Consequently, the negative pressure from the ejector 17 acts on the exit of the first blow-by gas returning passage 18, allowing the blow-by gas staying in the crank case 19 to flow in the intake passage 3 upstream of the supercharger 7 through the first blow-by gas returning passage 18, ejector 17, and intake bypass passage 16. Herein, since the intake bypass passage 16 is arranged by bypassing a part of the intake passage 3, the intake bypass passage 16 and the ejector 17 do not affect intake resistance in the intake passage 3. Accordingly, the blow-by gas is returned to the combustion chamber 20 without increasing intake resistance in the intake passage 3 during operation of the supercharger 7.

According to the ejector 17 in the present embodiment, when air is introduced as working fluid into the nozzle 32 and then injected from the nozzle 32, the negative pressure is generated in the decompression chamber 31*a*. This negative pressure acts to suck blow-by gas as target fluid into the outer pipe 31 through the suction port 31*c*. The sucked blow-by gas is then discharged together with the air out of the outer pipe 31 through the throat 31*b* and the exit 31*d*. Herein, the valve 36 provided in the nozzle 32 adjusts the flow rate of air allowed to flow through the nozzle 32. As the air pressure (supercharging pressure) acting on the nozzle 32 rises, the valve element 37 in the valve 36 comes close to the valve seat 32c by the air pressure against the pressing force of the spring 38. That is, the valve element 37 moves into the valve closing direction. Thus, the air flow rate allowed to flow through the nozzle 32 decreases, so that the amount of air to be injected from the nozzle 32 decreases. This can prevent an increase in air flow rate even when the air pressure (supercharging pressure) acting on the nozzle 32 rises, suppress the generation of negative pressure by the ejector 17, and restrain the blow-by gas flow rate from increasing more than necessary. It is therefore possible to suppress an excessive returning amount of blow-by gas to the engine 1.

Consequently, in a high supercharging region in which the supercharger 7 provides high supercharging pressure, the supercharging pressure is not consumed in the ejector 17 and hence all the supercharging pressure can be supplied to the engine 1. This can prevent lowering of output power of the engine 1 in the high supercharging region. Since an excessive returning amount of blow-by gas in the high supercharging region can be suppressed, it is possible to prevent the blow-by gas from carrying away engine oil from the crank case 19. Thus, the consumption of engine oil can be reduced. Furthermore, it is possible to prevent fluctuation of the air-fuel ratio of the engine 1 due to the excessive returning amount of blow-by gas, thereby preventing worsening of exhaust emission of the engine 1.

Figure 4:
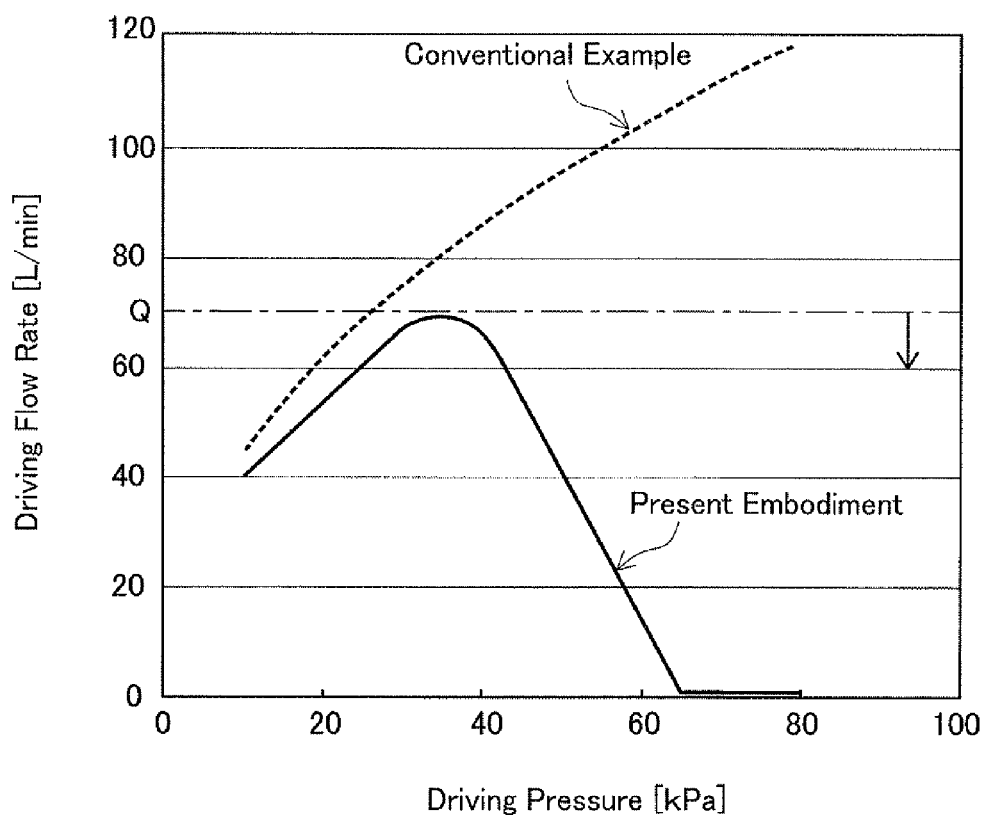
FIG. 4 is a graph showing air flow characteristics of the ejector in the embodiment.

FIG. 4 is a graph showing air flow characteristics of the ejector 17 in the present embodiment. In this graph, a solid line indicates the air flow characteristics of the ejector 17 in the present embodiment and a broken line indicates the air flow characteristics of an ejector in a conventional example having no valve. This graph reveals that, in the conventional example, as the pressure (driving pressure) of air to be supplied to the ejector rises, the flow rate (driving flow rate) of the air also gradually increases up to a maximum value. In contrast, in the present embodiment, as the driving pressure rises, the driving flow rate gradually increases to a predetermined upper limit (70 L/min in this case) and then gradually decreases therefrom, finally approaches almost zero. In the present embodiment, therefore, the negative pressure generated in the ejector 17 similarly changes according to the above air flow characteristics. The flow rate of blow-by gas allowed to flow in the intake passage 3 through the ejector 17 and others also exhibits the same characteristic tendency. In FIG. 4, a value "Q" of the driving flow rate represents an upper limit to limit the consumption flow rate of engine oil within a required range. The air flow characteristics in the present embodiment can be suppressed to a value less than the upper limit Q.

In the present embodiment, the air flowing in the nozzle 32 may contain sludge. The sludge contained in the air enters the bottom-closed cavity 37a through the opening of the valve element 37 and is trapped therein. It is therefore possible to prevent worsening of movement of the valve element 37 due to sludge and thus reduce variations in air flow characteristics caused by the ejector 17.

In the present embodiment, while no air flows in the nozzle 32, the valve element 37 of the valve 36 is pressed by the spring 38 in a fully opening direction and held in contact with a part of the nozzle 32 (the end face 33a of the pipe joint 33). Accordingly, in the fully opened state of the valve 36, the valve element 37 is pressed against and fixed to the nozzle 32. This can prevent vibration of the valve element 37 while the valve 36 is in the fully opened state, thereby preventing abrasion of the valve element 37 due to the vibration.

In the present embodiment, when the valve element 37 of the valve 36 is held in contact with a part of the nozzle 32, the flow passage 39 is formed between the valve element 37 and the nozzle 32. In the fully opened state of the valve 36, therefore, this flow passage 39 allows the air to flow in the nozzle 32. This can stabilize the air flow from when the air starts to flow in the ejector 17, and reduce variations in air flow rate.

In the present embodiment, in the valve 36, the valve element 37 includes the protruding portion 37b loosely inserted in the valve hole 32h of the valve seat 32c. Accordingly, the protruding portion 37b of the valve element 37 is loosely inserted in the valve hole 32h and the movement of the valve element 37 is guided by the insertion relation of the protruding portion 37b with respect to the valve hole 32h and the hollow space of the leading end portion 32a of the nozzle 32. As a result, the movement of the valve element 37 can be stabilized, thereby achieving stable air flow characteristics. This can stabilize the negative pressure characteristics generated in the ejector 17.

In the present embodiment, a part of the air supercharged by the supercharger 7 is injected from the nozzle 32, generating the negative pressure in the decompression chamber 31a, thereby sucking in blow-by gas through the suction port 31c. The sucked blow-by gas is discharged together with air out of the outer pipe 31 through the throat 31b and the exit 31d. As the supercharging pressure rises, it is possible to gradually suppress the generation of negative pressure in the ejector 17 to gradually reduce the blow-by gas returning amount.

In the present embodiment, since the PCV valve 23 is provided in the entrance of the second blow-by gas returning passage 22, the flow rate of blow-by gas allowed to flow in the second blow-by gas returning passage 22 is regulated by the PCV valve 23 to an appropriate value. It is accordingly possible to prevent an excessive amount of blow-by gas from returning to the combustion chamber 20 through the second blow-by gas returning passage 22.

The present invention is not limited to the above embodiment and may be embodied in other specific forms without departing from the essential characteristics thereof.

In the above embodiment, for instance, the engine 1 with a supercharger uses the ejector 17 configured as above to return blow-by gas to the engine 1 during supercharging and regulate the returning amount of blow-by gas. As an alternative, the ejector according to the invention can be used to return EGR gas to an engine and regulate a recirculating amount of EGR gas.

While the presently preferred embodiment of the present invention has been shown and described, it is to be understood that this disclosure is for the purpose of illustration and that various changes and modifications may be made without departing from the scope of the invention as set forth in the appended claims.

INDUSTRIAL APPLICABILITY

The present invention can be utilized for example in a device arranged to return or recirculate blow-by gas and EGR gas as target fluid to an intake passage during supercharging of an engine with a supercharger.

REFERENCE SIGNS LIST

16 Intake bypass passage
18 First blow-by gas returning passage
19 Crank case

31 Outer pipe
31a Decompression chamber
31b Throat
31c Suction port
31d Exit
32 Nozzle
32a Leading end portion
32b Entrance
32c Valve seat
32h Valve hole
33a End face
36 Valve
37 Valve element
37a Cavity
37b Protruding portion
37c Large-diameter portion
37d Middle-diameter portion
37e Small-diameter portion
37f Shoulder
37i Groove
37j Leg portion
38 Spring
39 Flow passage

The invention claimed is:

1. An ejector including:
an outer pipe;
a decompression chamber provided in the outer pipe on an entrance side for working fluid;
a throat provided in the outer pipe on an exit side for the working fluid;
a nozzle provided in the outer pipe on the entrance side for the working fluid, the nozzle including a leading end portion placed in the decompression chamber to inject the working fluid; and
a suction port provided in the outer pipe to open into the decompression chamber to suck target fluid into the decompression chamber, wherein
the ejector is configured such that the working fluid injected from the nozzle generates negative pressure in the decompression chamber to suck in the target fluid through the suction port, the target fluid being discharged together with the working fluid from the outer pipe;
the nozzle is provided with a valve to regulate a flow rate of the working fluid allowed to flow through the nozzle, the valve including a valve seat, a valve element provided to be movable into and out of contact with the valve seat, and a spring to urge the valve element in a direction to separate from the valve seat;
the valve element includes a bottom-closed cavity, the cavity opening toward an upstream side of the working fluid;
the valve element is configured to be pressed by a pressure of the working fluid such that the valve element moves in a valve-closing direction against a pressing force of the spring;
the outer pipe has an opening and the nozzle includes a flange on an outer circumference thereof, the outer pipe and the nozzle being configured such that the flange of the nozzle is fitted in the opening of the outer pipe to connect the nozzle and the outer pipe, thereby forming the decompression chamber between the outer pipe and the nozzle;
a pipe joint is provided to introduce the working fluid into the nozzle; and
the nozzle has an opening and the pipe joint includes a flange on an outer circumference thereof, the nozzle and the pipe joint being configured such that the flange of the pipe joint is fitted in the opening of the nozzle to connect the pipe joint and the nozzle, thereby forming a valve chamber for accommodating the valve element between the nozzle and the pipe joint while the motion of the valve element in a direction to separate from the valve seat is restricted by the pipe joint.

2. The ejector according to claim 1, wherein when the working fluid is not flowing in the nozzle, the valve is configured such that the valve element is pressed by the spring in a fully opening direction to contact with a part of the nozzle.

3. The ejector according to claim 2, wherein when the valve element is in contact with the nozzle, the valve provides a flow passage between the valve element and the nozzle.

4. The ejector according to claim 1, wherein the valve element of the valve includes a protruding portion loosely inserted in a valve hole of the valve seat.

5. The ejector according to claim 2, wherein the valve element of the valve includes a protruding portion loosely inserted in a valve hole of the valve seat.

6. The ejector according to claim 3, wherein the valve element of the valve includes a protruding portion loosely inserted in a valve hole of the valve seat.

7. A blow-by gas returning device for an engine equipped with a supercharger in an intake passage, the blow-by gas returning device including the ejector of claim 1, the ejector being configured to: (i) inject part of air supercharged by the supercharger as the working fluid from the nozzle; and (ii) suck blow-by gas of the engine as the target fluid into the decompression chamber through the suction port.

8. A blow-by gas returning device for an engine equipped with a supercharger in an intake passage, the blow-by gas returning device including the ejector of claim 2, the ejector being configured to: (i) inject part of air supercharged by the supercharger as the working fluid from the nozzle; and (ii) suck blow-by gas of the engine as the target fluid into the decompression chamber through the suction port.

9. A blow-by gas returning device for an engine equipped with a supercharger in an intake passage, the blow-by gas returning device including the ejector of claim 3, the ejector being configured to: (i) inject part of air supercharged by the supercharger as the working fluid from the nozzle; and (ii) suck blow-by gas of the engine as the target fluid into the decompression chamber through the suction port.

10. A blow-by gas returning device for an engine equipped with a supercharger in an intake passage, the blow-by gas returning device including the ejector of claim 4, the ejector being configured to: (i) inject part of air supercharged by the supercharger as the working fluid from the nozzle; and (ii) suck blow-by gas of the engine as the target fluid into the decompression chamber through the suction port.

11. A blow-by gas returning device for an engine equipped with a supercharger in an intake passage, the blow-by gas returning device including the ejector of claim 5, the ejector being configured to: (i) inject part of air supercharged by the supercharger as the working fluid from the nozzle; and (ii) suck blow-by gas of the engine as the target fluid into the decompression chamber through the suction port.

12. A blow-by gas returning device for an engine equipped with a supercharger in an intake passage, the blow-by gas returning device including the ejector of claim

6, the ejector being configured to: (i) inject part of air supercharged by the supercharger as the working fluid from the nozzle; and (ii) suck blow-by gas of the engine as the target fluid into the decompression chamber through the suction port.

* * * * *